Patented Nov. 7, 1922.

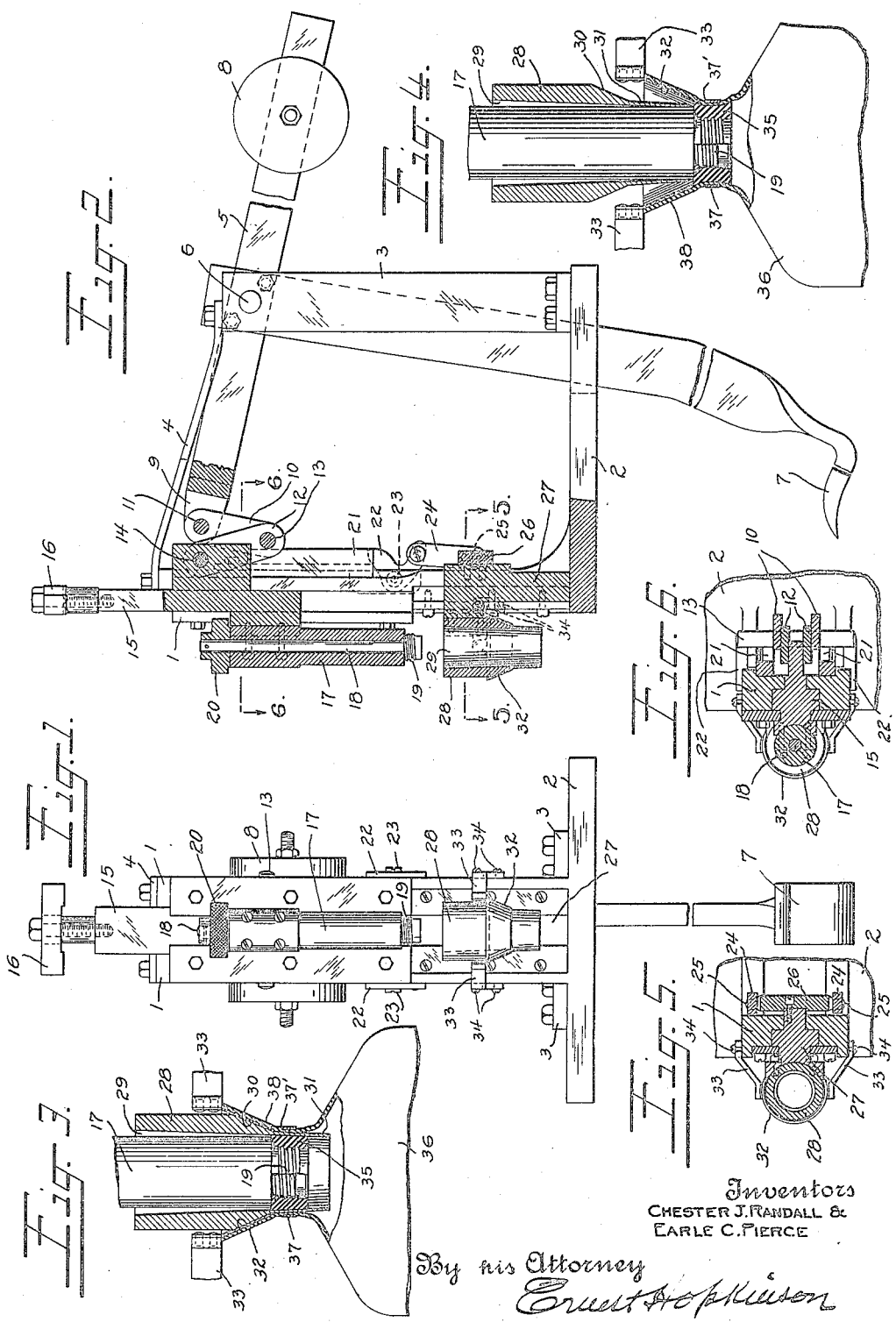

1,434,407

UNITED STATES PATENT OFFICE.

CHESTER J. RANDALL AND EARLE C. PIERCE, OF NAUGATUCK, CONNECTICUT, ASSIGNORS TO THE GOODYEAR'S INDIA RUBBER GLOVE MANUFACTURING COMPANY, A CORPORATION OF CONNECTICUT.

METHOD OF MAKING WATER BOTTLES AND APPARATUS THEREFOR.

Application filed November 14, 1921. Serial No. 514,968.

*To all whom it may concern:*

Be it known that we, CHESTER J. RANDALL and EARLE C. PIERCE, both citizens of the United States, and both residing at Naugatuck, county of New Haven, and State of Connecticut, have invented certain new and useful Improvements in Methods of Making Water Bottles and Apparatus Therefor, of which the following is a full, clear, and exact description.

This invention relates to a method of making water bottles and apparatus therefor, more particularly to an improvement in the method and apparatus for securing the stopper receiving plug in the neck of the bottle.

In the making of molded water bottles and similar articles having closures one method formerly used was to mold the bottle with its closure in place and provide a slit through which the core could be removed, and semi-cure it in this condition, the slit being then closed in a final curing operation. It was found, however, that it was possible to remove the core through the neck of the water bottle by somewhat enlarging the neck, and this method of molding bottles has gone into extensive use. It is necessary when using this method, however, to secure the stopper receiving plug in the neck of the bottle by a later operation, and many attempts have been made to provide a simple and cheap method of doing this. As the bottle is subjected to considerable strain at this point during use it is necessary that the plug be securely joined to the bottle neck in order to prevent its loosening or the leakage of water past the plug. One method largely used is to cement the plug in the neck of the bottle with a quick curing cement, but this method is expensive, as it entails the use of a large number of molds which must be placed around the necks of the bottles during the operation of curing the plugs in place. Another method considerably used is to cement a plug in the neck of the bottle and then reinforce the outside of the joint by placing a split clamping ring around the bottle neck or by wrapping the bottle neck with wire. The split clamping ring is more or less unsightly, and is also expensive, while when a wire wrapping is used, which latter is also rather unsightly, it is common to cover the wire wrapping with a strip of rubber. This method is also expensive and consumes considerable time.

An object of our invention is to provide a simple, cheap and efficient method of securing stopper receiving plugs in the necks of water bottles or similar articles.

Another object is to provide an apparatus for carrying out the method.

For a detailed disclosure of the invention reference is had to the accompanying specification and drawing, in which latter:

Fig. 1 is a front elevation of a machine for carrying out our method;

Fig. 2 is a side elevation, partly in section, of the machine;

Fig. 3 is an enlarged detail sectional view illustrating the position of parts of the apparatus at an intermediate stage in the operation;

Fig. 4 is a similar view showing the same parts at a later stage;

Fig. 5 is a sectional view on the line 5—5 of Fig. 2; and

Fig. 6 is a sectional view on the line 6—6 of Fig. 2.

Referring to the drawings the numeral 1 designates the frame of the machine which is mounted on a base 2, and extending upwardly from the base is a post 3 connected to the machine frame at the top by the brace 4. A lever 5 is pivotally mounted in the post 3 at 6 and rigidly connected to the lever is a foot pedal 7. At one end of the lever 5 a counter weight 8 is mounted and the opposite end of the lever is forked, each fork 9 having a link 10 pivotally connected thereto at 11. A link 12 is pivotally connected to the lower end of each link 10 by a pivot pin 13, which pivot pin extends outwardly some distance at each side of the links 10, as shown in Fig. 6. The links 12 are pivotally connected at 14 to a slide block 15 mounted in a channeled portion of the frame 1 as clearly shown in Figs. 2 and 6. At its upper end the slide block carries a stop member 16 adapted to coact with the frame 1 to limit the downward movement of the slide block for a purpose to be later described. Secured to the slide block 15 is a plunger 17 having rotatably mounted therein a spindle 18, to the lower end of which is secured a threaded head 19, while the upper end of the spindle carries a knurled thumb piece 20.

At the back of the frame 1 a pair of guide members 21 are mounted in a vertical position, and on these guide members the pivot pin 13 is adapted to slide in a manner to be later described. Adjacent the lower ends of the guides 21 a pair of bell crank levers 22 are pivotally mounted on the frame at 23. It will be noted from an inspection of Fig. 2 that the curved edges of the upper arms of the bell crank levers are substantially in alignment with the lower end of the guides 21. A link 24 is pivotally secured to the lower arm of each bell crank lever 22, and the lower ends of said links are pivotally connected at 25 to a plate 26, which latter is secured to a second slide block 27 movable in a channeled portion of the lower part of the frame 1. Attached to the slide block 27 is a tubular member 28 provided with a tapered bore 29 extending from its top to its bottom. Exteriorly the member 28 is beveled at the point 30 leaving the lower portion of the member 28 relatively thin walled, as shown at 31. Surrounding the member 28 is a frusto-conical guide member 32 provided with bracket arms 33, which latter are adjustably secured to the frame 1 by the set screw and slot connections 34.

In carrying out the method the stopper receiving plug 35, which is provided with slightly concaved outer walls, as shown in Fig. 4, is threaded on the head 19, and the bag 36 which is to receive the plug is supplied with a confining ring 37 which is slipped over the flexible funnel neck 38 of the bag. To aid in accurately centering the ring on the bag neck at the narrowed portion thereof the bag may be slightly recessed exteriorly at the proper point, as shown at 37'. The bag is then positioned with its funnel neck 38 drawn up over the guide 32, as shown in Fig. 3, and the pedal 7 operated. As the pedal is operated the lever 5 through the links 10 and 12 moves the slide block 15 downwardly, thereby causing the plunger 17 to insert the stopper receiving plug 35 within the tapered bore 29, and the downward movement continues until the stop 16 engages the frame 1, leaving the parts substantially in the position shown in Fig. 3. The plug 35, while made of a harder composition than the bag, still has enough elasticity to be compressed by the member 28 until its diameter is reduced and its outer concaved walls are substantially straight as shown in Fig. 3, and at the limit of movement of the plunger 17 the plug 35 is disposed in alignment with the outer confining ring 37. During the downward movement of the slide block 15 and plunger 17 the pivot pin 13 of the links 10 and 12 moves downwardly along the surface of the guides 21, and shortly before the stop 16 operates to halt the downward movement of the slide block and plunger 17 the pivot pin moves off the guides 21 and onto the curved edges of the upper arms of the bell crank levers 22. As soon as the downward movement of the plunger 17 is halted, the toggle formed by the lever 5 and links 10 tends to straighten out, and the pivot pin 13 thereupon moves the upper arms of the bell crank levers 22 to the left, as shown in Fig. 2, causing the links 24 to draw upwardly the slide block 27 and tubular member 28. As the thin portion 31 of the tubular member 28 is withdrawn from around the plug 35, the latter expands to its original position and firmly engages the bottle neck at the point opposite to where the neck is confined and slightly constricted by the band 37. In the present instance the band 37 is shown as formed of metal, but as its sole purpose is to firmly hold the bottle neck at the point where the stopper receiving plug engages the latter, it may be formed of any suitable material, or a wire wrapping may be substituted. However, as before pointed out, the wire wrapping is unsightly and entails an additional expense for covering it with rubber. The band 37 may be enameled in any suitable color to provide an artistic finish for the bag. The joint between the closure plug and bottle neck is so firm that the use of cement is unnecessary to secure a stable and water-tight connection. However, considerable friction is produced by the downward movement of the plug 35, through the tapered bore 29, and it has been found that if a little cement is placed in the concaved portion of the plug 35 it acts as a lubricant, and greatly aids in the insertion of the plug in the bottle neck.

It will be seen that by our invention a method and apparatus for securing the stopper receiving plug in the bottle neck have been provided which are simple, cheap and efficient, while at the same time greatly reducing the time and labor required for the operation. While the method and apparatus herein described disclose the invention as applied to a water bottle, it is obvious that they are not limited in their application to the specific article shown, but may be used for other analogous purposes.

Having thus described our invention, what we claim and desire to protect by Letters Patent is:

1. The method of attaching elastic stopper-receiving plugs to the necks of receptacles which consists in forming the complementary faces of the neck and plug with an interfitting projection and recess, inserting the plug in the neck while temporarily constricted, and releasing the plug.

2. The method of attaching elastic stopper-receiving plugs to the necks of receptacles which consists in forming the neck of the receptacle with an inward projection, forming the plug with a complementary recess, temporarily constricting the plug and inserting it in the receptacle neck to a point with its recess in register with said projection, and releasing the plug.

3. The method of attaching elastic stopper-receiving plugs to the necks of receptacles which consists in forming the interior of the receptacle neck with a circumferential projection, forming the outer wall of the plug with a complementary circumferential recess, inserting the plug in the neck while temporarily constricted, and allowing the plug to expand while retaining it in its proper relative position in the neck.

4. The method of attaching elastic stopper-receiving plugs to the necks of flexible water bottles which consists in permanently confining the neck of a bottle, temporarily constricting the stopper-receiving plug and inserting it in the bottle neck to a point opposite the confined portion thereof, and releasing the plug.

5. The method of attaching elastic stopper-receiving plugs to the necks of flexible water bottles which consists in exteriorly and permanently confining and constricting the neck of a bottle, temporarily constricting the plug and simultaneously inserting it in the bottle neck to a point opposite the confined portion thereof, and releasing the plug.

6. The method of attaching elastic stopper-receiving plugs to the necks of flexible receptacles which consists in forming the interior of the receptacle neck with a circumferential projection, forming the outer wall of the plug with a complementary circumferential recess, permanently confining and constricting the exterior of the neck, inserting the plug in the neck and simultaneously constricting it, and allowing the plug to expand while maintaining said projection and recess in alignment.

7. In combination, slidable means for retaining a stopper receiving plug, a slidable plug constricting device in alignment therewith, a relatively fixed bottle neck positioning member surrounding said constricting device, and means for first moving the plug to insert it in the constricting device and then withdrawing the latter from the positioning member.

8. A machine for assembling elastic plugs in receptacle necks comprising means for positioning a receptacle neck, means for inserting a plug in said neck including means for centering and holding the plug, means disposed within said positioning means for compressing the plug as it is inserted, and means for releasing the plug from said last means after insertion, whereby the plug may expand and frictionally engage the neck.

9. In combination, tapering means for positioning a receptacle neck, means for inserting an elastic plug therein, means for constricting said plug and spacing it from the neck during insertion, and means for withdrawing said constricting and spacing means after insertion of the plug.

10. In combination, means for holding an elastic plug, adjustable means for centering a bottle neck in alignment therewith, means for moving said first means toward said centering means to insert the plug, means for constricting and spacing said plug from the bottle neck during insertion, and means for withdrawing said constricting and spacing means after insertion of the plug.

11. In combination, means for positioning a receptacle neck and an elastic stopper-receiving plug in alignment, means for interfitting said plug and neck including means for temporarily constricting the plug, and means for subsequently releasing the plug.

12. In combination, means for positioning a receptacle neck and an elastic stopper-receiving plug in longitudinal alignment, means for relatively moving the parts toward transverse alignment, stop means for halting said movement when the parts are in transverse alignment, means for constricting said plug during said movement, and means for subsequently rendering such constricting means inoperative.

13. In combination, adjustable means for positioning a flexible water bottle neck, tubular spacing means adapted to be disposed within said neck, means for inserting an elastic stopper-receiving plug within said spacing means and in alignment with said neck, and means for subsequently withdrawing said spacing means.

14. In combination, means for positioning an elastic stopper-receiving plug, means in longitudinal alignment therewith for exteriorly receiving and positioning a water bottle neck, tubular plug constricting and spacing means adapted to be disposed interiorly of said last means, and means for successively moving said plug positioning and constricting means in opposite directions.

15. In combination, a plunger, means for positioning an elastic plug thereon, means for positioning a receptacle neck in alignment therewith, means for advancing said plunger to dispose a plug carried thereby within the receptacle neck, a stop for limiting the movement of said plunger, means for compressing said plug in its movement toward the neck, and means for freeing said compressing means from the plug subsequent to the operation of said stop.

Signed at Naugatuck, Connecticut, this 8th day of November, 1921.

CHESTER J. RANDALL.
EARLE C. PIERCE.